United States Patent
Chi et al.

(10) Patent No.: US 10,042,241 B1
(45) Date of Patent: Aug. 7, 2018

(54) PROJECTION METHOD AND ASSOCIATED OPTICAL SYSTEM

(71) Applicant: HIMAX TECHNOLOGIES LIMITED, Tainan (TW)

(72) Inventors: Cheng-Hung Chi, Tainan (TW); Yi-Nung Liu, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/873,902

(22) Filed: Jan. 18, 2018

(51) Int. Cl.
G03B 21/14 (2006.01)
G02B 27/09 (2006.01)
G03B 21/20 (2006.01)
G02B 27/42 (2006.01)
G02B 27/10 (2006.01)

(52) U.S. Cl.
CPC ....... G03B 21/206 (2013.01); G02B 27/0944 (2013.01); G02B 27/0955 (2013.01); G02B 27/1086 (2013.01); G02B 27/4233 (2013.01); G03B 21/2006 (2013.01)

(58) Field of Classification Search
CPC ............ G02B 27/0961; G02B 27/1093; G02B 27/106; G02B 27/0944; G02B 27/4233; G02B 27/20; G02B 11/02; G02B 5/1861
See application file for complete search history.

(56) References Cited

U.S. PATENT DOCUMENTS

| 8,384,997 | B2* | 2/2013 | Shpunt | G01B 11/25 359/569 |
| 9,874,759 | B2* | 1/2018 | Chern | G02B 27/095 |
| 2008/0297614 | A1* | 12/2008 | Lieberman | G06F 3/0426 348/222.1 |
| 2017/0199310 | A1* | 7/2017 | Okano | G02B 5/1861 |
| 2018/0100733 | A1* | 4/2018 | Thuries | G02B 27/0961 |

* cited by examiner

Primary Examiner — William C Dowling
(74) Attorney, Agent, or Firm — Winston Hsu

(57) ABSTRACT

A method for projection includes: emitting an input beam to a diffractive optical element (DOE); and diffracting the input beam via the DOE with a specific fan-out angle θ and a number of fan-out points N on a surface, wherein the specific fan-out angle θ and the number of fan-out points N fit the following equation:

$$\sin\left(\frac{\theta}{2}\right) = \frac{(N-1)}{2} \cdot \frac{\lambda}{K\Delta},$$

where λ is a wavelength of the input beam, Δ is a pixel size of the DOE, and K is an integer not smaller than N.

10 Claims, 7 Drawing Sheets

PROJECTION METHOD AND ASSOCIATED OPTICAL SYSTEM

BACKGROUND OF THE INVENTION

1. Field of the Invention

The present inventions relates to an optical system, and particularly to an optical system for optical pattern projection, and an associated method.

2. Description of the Prior Art

Optical pattern projection is used in a variety of applications, such as optical three-dimensional (3D) mapping, area illumination, and LCD backlighting. In some applications, diffractive optical elements (DOEs) are used to create a desired projection pattern.

A double-DOE system has a large FOV and potential for dynamic patterning. The system is composed of a fan-out DOE and a tile DOE, wherein the fan-out DOE is used to repeat the pattern generated from the tile DOE. To avoid overlapping of patterns repeated in two adjacent fan-out points, the relationship between the diffraction angle of the fan-out DOE and the tile DOE has to be designed under specific rules. Noise order also has a huge influence on the performance of the double-DOE system. Therefore, the diffraction angle between the two DOEs should be arranged very carefully, and the signal order should be designed in a specific position to prevent noise order appearing between two adjacent signal orders.

SUMMARY OF THE INVENTION

One of the objectives of the present inventions is to provide an optical system and an associated method to solve the abovementioned problem.

According to an embodiment of the present invention, a method for projection is disclosed, comprising: emitting an input beam to a diffractive optical element (DOE); and diffracting the input beam via the DOE with a specific fan-out angle θ and a number of fan-out points N on a surface, wherein the specific fan-out angle θ and the number of fan-out points N fit the following equation:

$$\sin\left(\frac{\theta}{2}\right) = \frac{(N-1)}{2} \cdot \frac{\lambda}{K\Delta},$$

where λ is a wavelength of the input beam, Δ is a pixel size of the DOE, and K is an integer not smaller than N.

According to an embodiment of the present invention, an optical system is disclosed, comprising: a radiation source and a diffractive optical element (DOE), wherein the radiation source is arranged to generate an input beam; and the DOE is arranged to diffract an input beam with a specified fan-out angle θ and a number of fan-out points N on a surface. The specific fan-out angle θ and the number of fan-out points N fit the following equation:

$$\sin\left(\frac{\theta}{2}\right) = \frac{(N-1)}{2} \cdot \frac{\lambda}{K\Delta},$$

where λ is a wavelength of the input beam, Δ is a pixel size of the DOE, and K is an integer not smaller than N.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
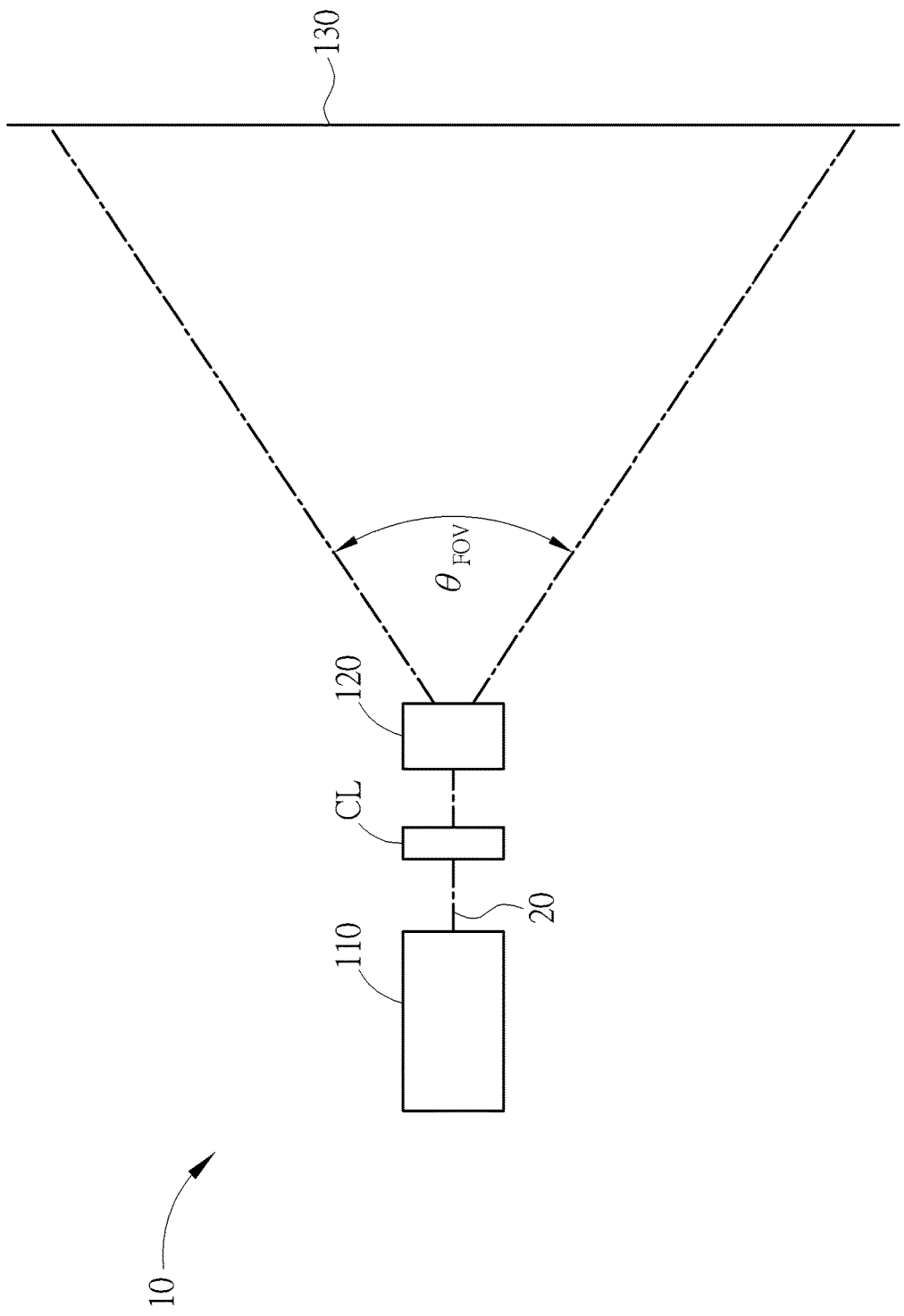
FIG. 1 is a diagram illustrating a top-view of an optical system according to an embodiment of the present invention.

FIG. 1 is a diagram illustrating a top-view of an optical system 10 according to an embodiment of the present invention. As shown in FIG. 10, the optical system 10 comprises a radiation source 110, a collimating lens CL, a diffractive optical element (DOE) 120 and a surface 130, wherein the radiation source 110 may be implemented by a laser diode arranged to generate and project an input beam 20 via the collimating lens CL and the DOE 120 onto the surface 130, and the collimating lens CL makes sure the wave front of the input beam incident on the DOE 120 as possible as collimated. The DOE 120 is arranged to generate a pattern on the surface 130. Although the surface 130 shown in FIG. 1 is a planar surface for the sake of simplicity, this is only for illustrative purposes and not a limitation of the present invention. In other embodiments, the surface 130 may be any surface of an object. The DOE 120 may comprise an active optical surface, which is etched, molded or deposited on a suitable substrate, using methods well-known in the art. The implementation of the DOE 120 should also be well-known to those skilled in the art and therefore the detailed description is omitted here. As shown in FIG. 1, the DOE 120 projects the pattern over a field of view (FOV) with full angular extent or $\theta_{FOV}$ in the horizontal direction. As mentioned in the prior art, to prevent noise order from appearing between two adjacent signal orders, the signal order should be carefully designed in a specific position. The present invention proposes a method of projection for achieving the goal which will be discussed in the following paragraphs.

Figure 2:
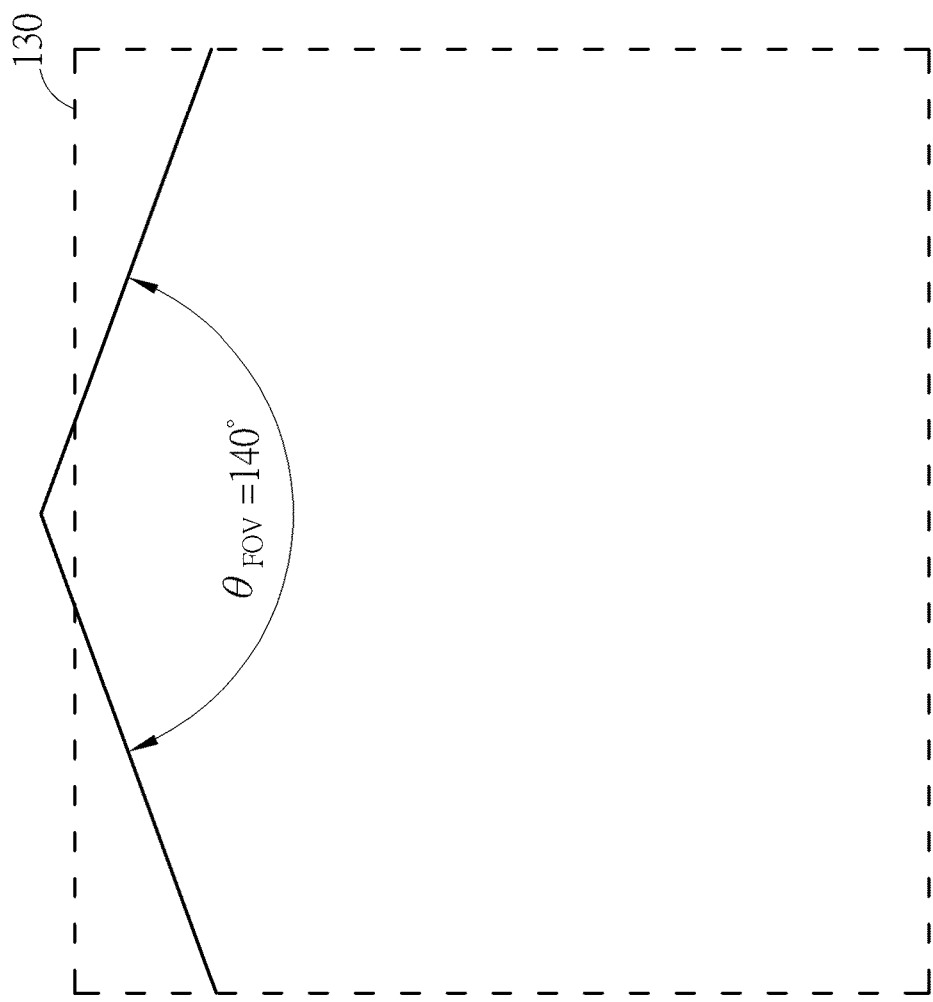
FIG. 2 is a diagram illustrating a maximum diffraction angle and the surface of the optical system shown in FIG. 1.

FIG. 2 is a diagram illustrating a maximum diffraction angle of the optical system 10 and the surface 130. The formula for calculating the diffraction angle is shown below:

$$\sin\left(\frac{\theta_{FOV}}{2}\right) = \frac{\lambda}{2\Delta}, \quad (1)$$

where $\lambda$ is the wavelength of the input beam 20, and $\Delta$ is a pixel (sampling) size of the DOE plane. Given that the input beam is an infrared light whose wavelength is 940 nm, and the pixel size $\Delta$ is 500 nm, the maximum diffraction angle $\theta_{FOV}$ is 140°. In addition, according to the discrete Fourier transform (DFT), the maximum frequency $f_{max}$ which can be obtained on the surface 130 is the inverse of the pixel size $\Delta$ in the plane of the DOE 120:

$$f_{max} = \frac{1}{2\Delta}. \quad (2)$$

Figure 3:
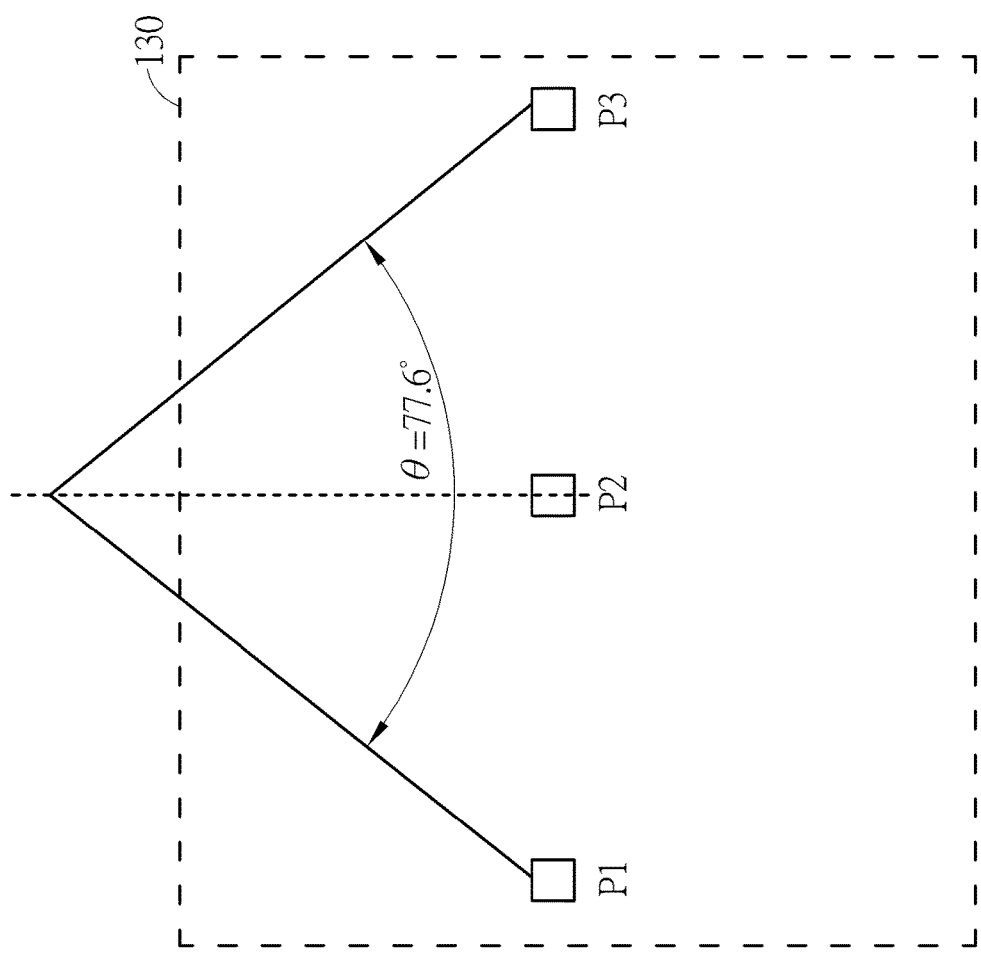
FIG. 3 is a diagram illustrating fan-out points projected on the surface of the optical system shown in FIG. 1 with a specific fan-out angle according to an embodiment of the present invention.
Figure 4:
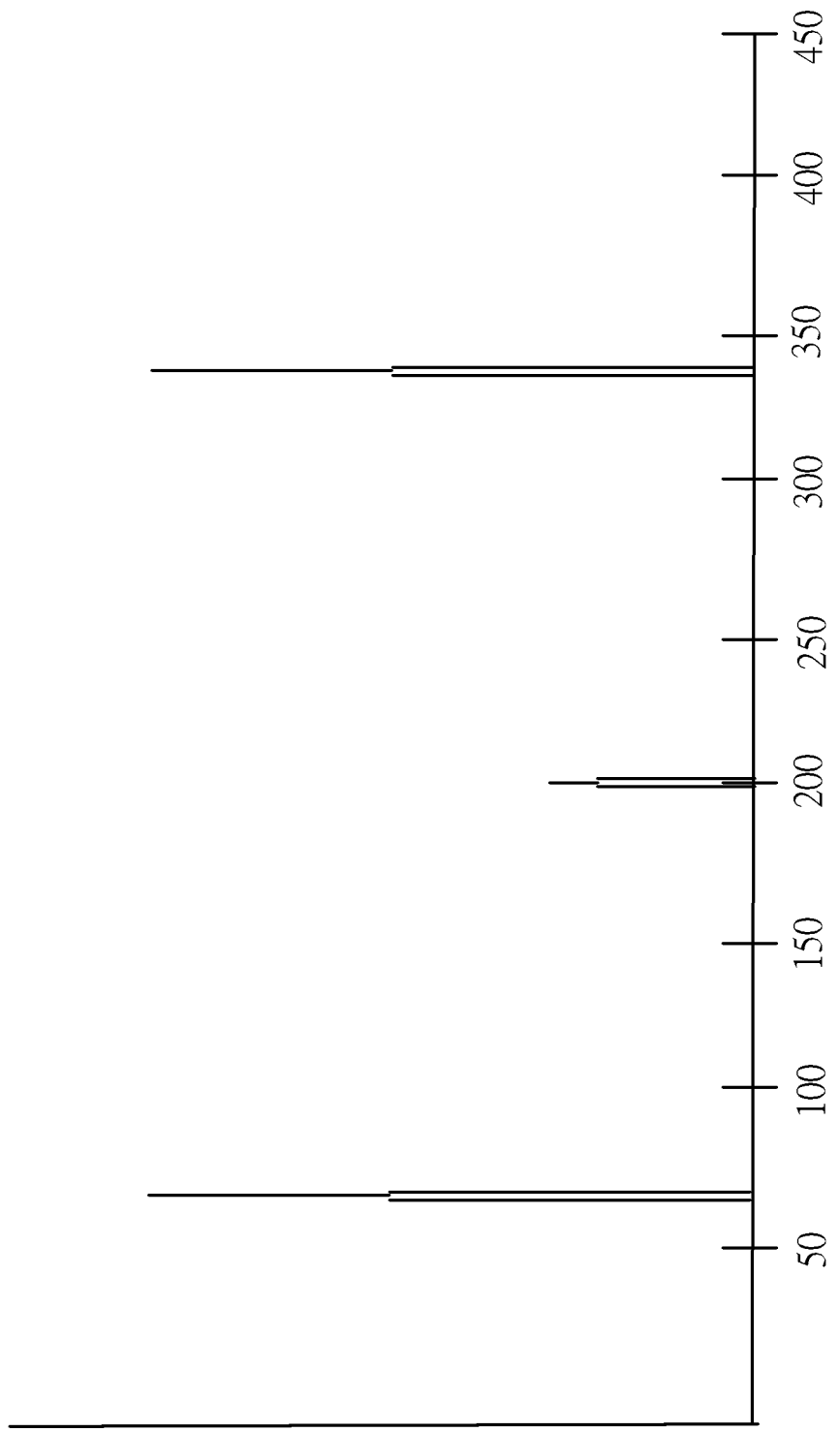
FIG. 4 is a diagram illustrating a signal order according to the embodiment of FIG. 3.

FIG. 3 is a diagram illustrating fan-out points N projected on the surface 130 with a specific fan-out angle $\theta$ according to an embodiment of the present invention. In the method of projection proposed by the present invention, a number of fan-out points projected in a row on the surface 130 should be determined. As shown in FIG. 3, the number of fan-out points is determined to be 3. Therefore, fan-out points P1, P2, and P3 are projected in a row on the surface 130. It should be noted that FIG. 3 only illustrates one row of fan-out points projected on the surface 130; however, those skilled in the art should readily understand that the pattern projected on the surface 130 via the DOE 120 should comprise a plurality of columns and rows. To effectively eliminate the noise order between points, the fan-out points P1, P2, and P3 are projected with the specific fan-out angle $\theta$ which fits the following equation:

$$\sin\left(\frac{\theta}{2}\right) = \frac{(N-1)}{2} \cdot \frac{\lambda}{K\Delta}, \quad (3)$$

where K is an integer not smaller than N. Given that the input beam is an infrared light whose wavelength is 940 nm, the pixel size $\Delta$ is 500 nm, the number of fan-out points N is 3 and, in this embodiment, K is equal to N=3, the specific fan-out angle $\theta$ can be determined to be 77.6°. By adopting the specific fan-out angle $\theta$=77.6° to diffract the input beam 20, the signal order projected on the surface 130 will be as illustrated in FIG. 4. In FIG. 4, it can be observed that there is no noise order between two fan-out points, wherein the x-axis in FIG. 4 represents the signal position of the fan-out points P1, P2 and P3 on the surface 130 while the y-axis represents the magnitude of the signals. In addition, the frequency f arranged to generate the signal order shown in FIG. 4 and a unit pattern period $\delta$ of the DOE 120 fit the following equations:

$$f = \frac{1}{K\Delta} \quad (4)$$

$$\delta = K\Delta \quad (5)$$

Figure 5:
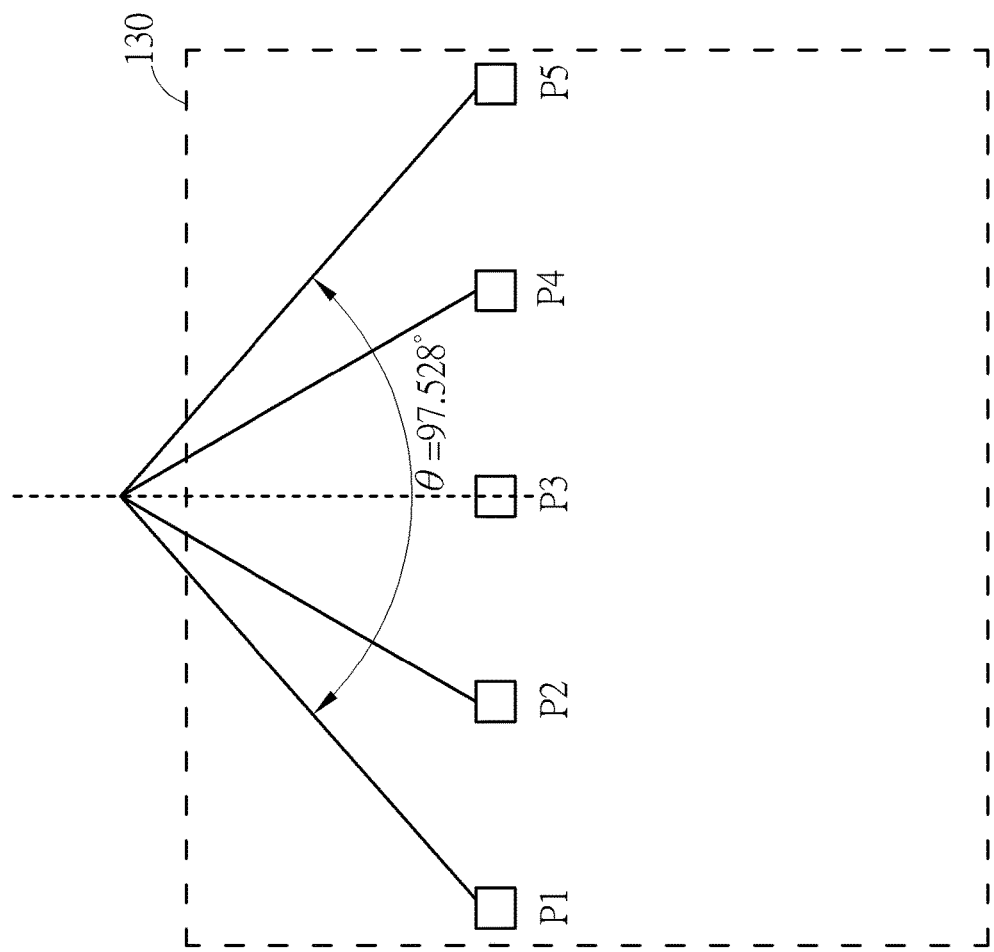
FIG. 5 is a diagram illustrating fan-out points projected on the surface of the optical system shown in FIG. 1 with a specific fan-out angle according to another embodiment of the present invention.
Figure 6:
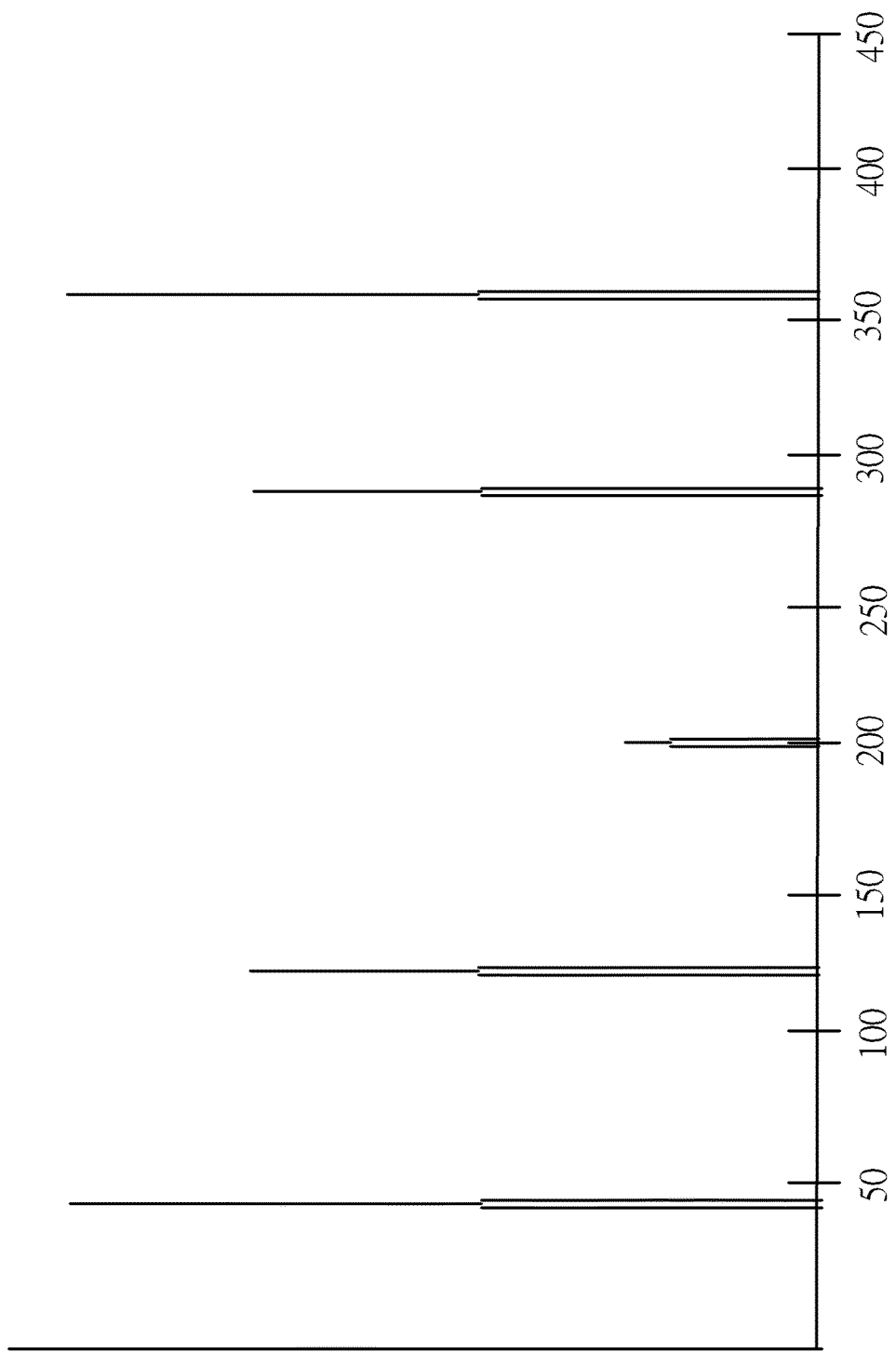
FIG. 6 is a diagram illustrating a signal order according to the embodiment of FIG. 5.

FIG. 5 is a diagram illustrating fan-out points N projected on the surface 130 with a specific fan-out angle $\theta$ according to another embodiment of the present invention. In the embodiment of FIG. 5, the number of fan-out point N is determined to be 5. Therefore, fan-out points P1, P2, P3, P4 and P5 are projected in a row on the surface 130. To effectively eliminate the noise order between points, the fan-out points P1, P2, P3, P4 and P5 are projected with the specific fan-out angle $\theta$ which fits the equation (3) shown above. Given that the input beam is an infrared light whose wavelength is 940 nm, the pixel size $\Delta$ is 500 nm, the number of fan-out points N is 5 and K is equal to N=5, the specific fan-out angle $\theta$ can be determined to be 97528°. By adopting the specific fan-out angle $\theta$=97.528° to diffract the input beam 20, the signal order projected on the surface 130 will be as illustrated in FIG. 6. In FIG. 6, it can be observed that there is no noise order between two fan-out points, wherein the x-axis in FIG. 6 represents the signal positions of the fan-out points P1, P2, P3, P4 and P5 on the surface 130 while the y-axis represents the magnitude of signals.

Figure 7:
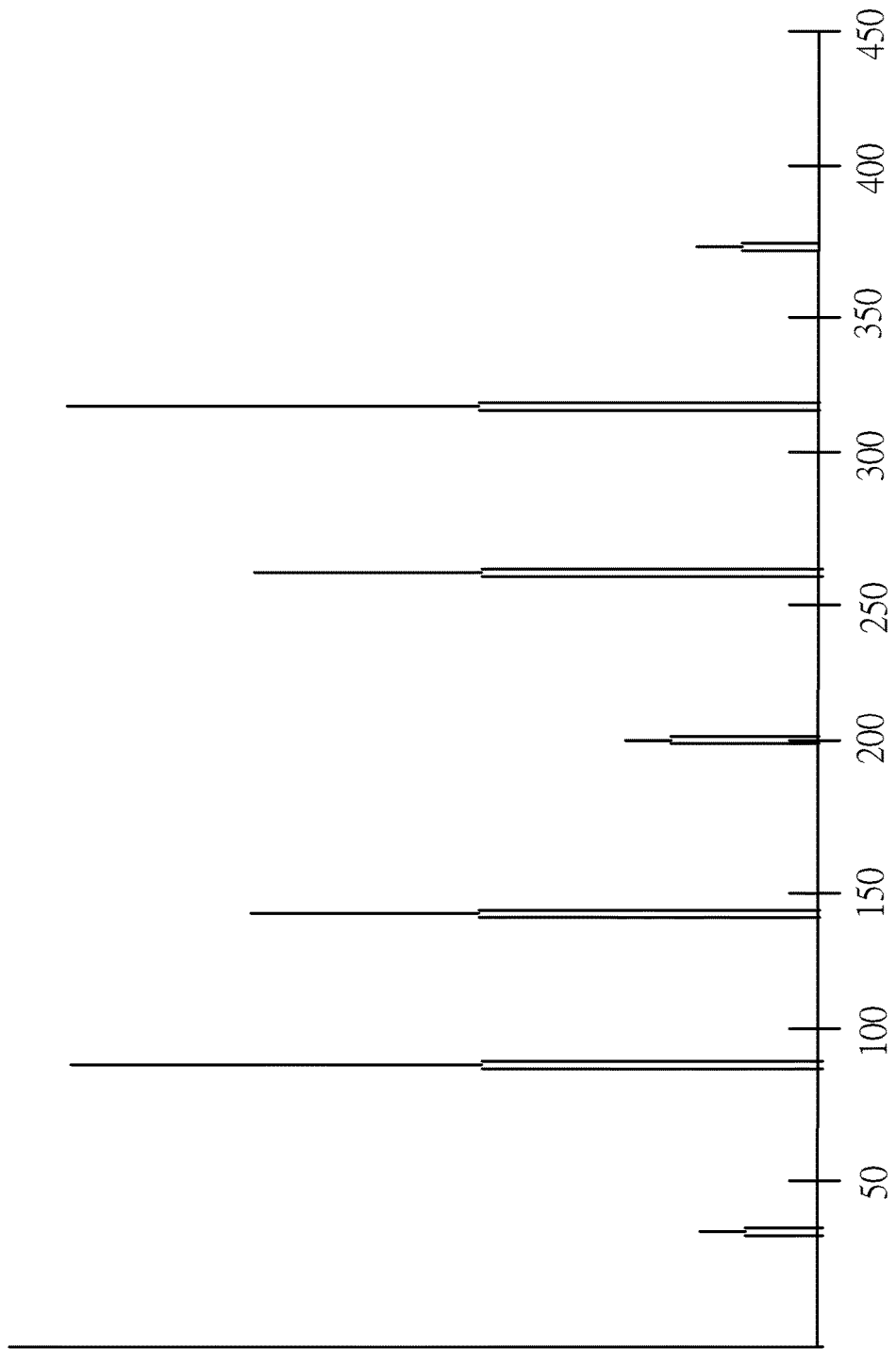
FIG. 7 is a diagram illustrating a signal order according to an embodiment of the present invention.

In other embodiments, the integer K in the equation (3) can be configured to be greater than N. For example, given that the input beam is an infrared light whose wavelength is 940 nm, the pixel size $\Delta$ is 500 nm, the number of fan-out points N is 5 and, in this embedment, K is 7, the specific fan-out point $\theta$ can be determined to be 64.949°. By adopting the specific fan-out angle $\theta$=64.949° to diffract the input beam 20, the signal order projected on the surface 130 will be as illustrated in FIG. 7. In FIG. 7, it can be observed that the signal order projected on the surface 130 shows 7 signal positions, and there is no noise order between two signal positions. The 5 signal positions in the middle of the surface 130 are considered as a signal window, however, due to the number of fan-out points N being determined to be 5. Therefore, the left signal position and the right signal position outside the signal window are regarded as noise order. These noise orders may be used as amplitude freeform during the iterative Fourier transform algorithm (IFTA) process to increase the uniformity between the signal orders.

It should be noted that, given the acceptable offset of the process of manufacturing the DOE 120, the specific fan-out angle $\theta$ might not be as accurate as the mathematical results deduced from the equation (3). Those alternative designs using a fan-out angle that approximates the mathematical results deduced from the equation (3) to diffract the input beam shall fall within the scope of the present invention.

Briefly summarized, after the fan-out points N are determined, the specific fan-out angle $\theta$ which fits the proposed equation (3) is adopted to diffract the input beam 20 via the DOE 120, thereby effectively eliminating the noise order of the signal order projected on the surface 130 can.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for projection, comprising:
emitting an input beam to a diffractive optical element (DOE); and
diffracting the input beam via the DOE with a specific fan-out angle θ and a number of fan-out points N on a surface, wherein the specific fan-out angle θ and the number of fan-out points N fit the following equation:

$$\sin\left(\frac{\theta}{2}\right) = \frac{(N-1)}{2} \cdot \frac{\lambda}{K\Delta},$$

where $\lambda$ is a wavelength of the input beam, $\Delta$ is a pixel size of the DOE, and K is an integer not smaller than N.

2. The method of claim 1, wherein K is equal to the number of the fan-out points N.

3. The method of claim 1, wherein K is greater than the number of fan-out points N.

4. The method of claim 1, wherein a frequency f arranged to generate a signal order fits the following equation:

$$f = \frac{1}{K\Delta}.$$

5. The method of claim 1, wherein a unit pattern period δ of the DOE fits the following equation:

δ=KΔ.

6. An optical system, comprising:
a radiation source, arranged to generate an input beam; and
a diffractive optical element (DOE), arranged to diffract an input beam with a specified fan-out angle θ and a number of fan-out points N on a surface, wherein the specific fan-out angle θ and the number of fan-out points N fit the following equation:

$$\sin\left(\frac{\theta}{2}\right) = \frac{(N-1)}{2} \cdot \frac{\lambda}{K\Delta},$$

where $\lambda$ is a wavelength of the input beam, $\Delta$ is a pixel size of the DOE, and K is an integer not smaller than N.

7. The optical system of claim 6, wherein K is equal to the number of fan-out points N.

8. The optical system of claim 6, wherein K is greater than the number of fan-out points N.

9. The optical system of claim 6, wherein a frequency f arranged to generate a signal order fits the following equation:

$$f = \frac{1}{K\Delta}.$$

10. The optical system of claim 6, wherein a unit pattern period δ of the DOE fits the following equation:

δ=KΔ.

* * * * *